(12) United States Patent
Kim

(10) Patent No.: US 6,840,972 B1
(45) Date of Patent: Jan. 11, 2005

(54) MULTI CYCLONE VACUUM CLEANER

(75) Inventor: Dae Chul Kim, Pusankwangyok-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/204,045

(22) PCT Filed: Mar. 16, 2000

(86) PCT No.: PCT/KR00/00222

§ 371 (c)(1),
(2), (4) Date: Aug. 16, 2002

(87) PCT Pub. No.: WO01/60226

PCT Pub. Date: Aug. 23, 2001

(30) Foreign Application Priority Data

| Feb. 19, 2000 | (KR) | 2000-8037 |
| Mar. 3, 2000 | (KR) | 2000-10629 |
| Mar. 3, 2000 | (KR) | 2000-10630 |

(51) Int. Cl.[7] ............... B01D 45/12; B01D 50/00
(52) U.S. Cl. ............... 55/337; 55/349; 55/459.1; 55/481; 55/503; 55/DIG. 3; 96/416
(58) Field of Search ............... 55/337, 349, 459.1, 55/481, 503, 345, DIG. 3; 96/416

(56) References Cited

U.S. PATENT DOCUMENTS 5,135,552 A * 8/1992 Weistra ............... 55/337
6,484,350 B2 * 11/2002 Yung ............... 15/327.1

* cited by examiner

*Primary Examiner*—Robert A. Hopkins
(74) *Attorney, Agent, or Firm*—McKenna Long & Aldridge LLP

(57) ABSTRACT

The disclosure is directed to a cyclone dust collector for separating air from dusts by way of a centrifugal force and, more particularly, to a novel canister type vacuum cleaner capable of using a dual cyclone dust collector with maximized allowable dust capacity. The entire structure of the vacuum cleaner as suggested herein is configured for the user's simple manipulation in discarding various foreign matters collected in the vacuum cleaner, thereby improving reliability to the user.

20 Claims, 15 Drawing Sheets

MULTI CYCLONE VACUUM CLEANER

This application claims the benefit of International Application No. PCT/KR00/00222 filed Mar. 16, 2000, which claims benefit of Korean Patent Application Nos. 2000/08037 filed on Feb. 19, 2000, 2000/10629 filed on Mar. 3, 2000 and 2000/10630 filed on Mar. 3, 2000 which are all hereby incorporated by reference for all purposes as if fully set forth herein.

BACKGROUND OF THE INVENTION

1. Field of the Invention

The present invention relates generally to a cyclone dust collector making use of cyclone action and, more particularly, to a vacuum cleaner provided with the cyclone dust collector.

2. Discussion of the Related Art

Among the cyclone dust collectors, a duel type cyclone dust collector comprising a primary cyclone dust collector 1 and a secondary cyclone dust collector is configured to perform iterative collection of foreign matters more effectively than a single cyclone dust collector.

FIGS. 1 to 3 illustrate an application of the above-stated dual type cyclone dust collector to an upright type vacuum cleaner. The upright vacuum cleaner has a dual type cyclone dust cleaner including primary and secondary cyclone dust collectors 1 and 2 provided in a cleaner body, a fan 3 provided at the bottom in the cleaner body for generating the suction force, and a fan motor 4 for driving the fan 3.

The dual type cyclone dust collector operates by driving the fan motor 4 to rotate the fan 3, which generates a suction force. Thus a variety of foreign matters as well as air in the room are sucked into the dual type cyclone dust collector and introduced into an exterior body 1a via the primary cyclone dust collector 1 and a first air inlet passage 1b. The air and fine dust introduced into the exterior body 1a pass through a first air outlet passage 1c and then a second air inlet passage 2b due to the suction force and then enter an interior body 2a. In the meantime, relatively large dust particles cannot enter through holes formed on the circumferential surface of the first air outlet passage 1c and gather at the bottom in the exterior body 1a due to their weight As shown in FIG. 2, the air and the fine dust introduced into the interior body 2a are subjected to a centrifugal force during entrance to the interior body 2a This force results from the second air inlet passage 2b extending in a tangential direction with respect to the circumference of the interior body 2a Thus the air and the fine dust rotating along the inside of the interior body 2a are separated from each other due to a difference in the centrifugal force. Relatively heavy-weighted fine dust falls down along the inside wall of the interior body 2a due to their weight and gather in a dust collecting section 2d, and the air escapes interior body 2a via a second air outlet passage 2c though an ascending air current formed at the center of the cyclone inside of the interior body 2a.

A partition plate 2e is provided to separate the dust collecting section 2d from the dust collection section of the exterior body 1a so that the foreign matter collected in the exterior body 1a and interior body 2a are kept separate.

The secondary cyclone dust collector 2 of the above stated dual cyclone dust collector may be configured to collect fine dust. Nevertheless, it is still possible that relatively light-weighted fine dust may pass through the second air outlet pass to the fan 3 and the fan motor 4. This is because the secondary cyclone dust collector 2 collects foreign matters using the cyclone effect in the same manner as the primary cyclone dust collector 1. Therefore, fine dust unable to be separated from the air using the cyclone effect will pass along with the air to the fan 3 and fan motor 4. The primary cyclone dust collector 1 solely collects relatively large dust, while the fine dust continues to enter the secondary cyclone dust collector 2, which may have a dust capacity that is too small so that the user must discard the foreign matters collected in the secondary cyclone dust collector 2 in order to prevent damage to the fan motor 4.

To solve the above problem, the primary cyclone dust collector 1 has to have a large-sized exterior body, which is why the dual type cyclone dust collector has been applied only to upright type vacuum cleaners. In other words, the above-described dual cyclone dust collector has such a low dust capacity that it cannot be applied to a canister type vacuum cleaner thereby inconveniencing users.

SUMMARY OF THE INVENTION

An advantage of the present invention is to provide a canister type vacuum cleaner using a dual type cyclone dust collector having a primary cyclone dust collector with a maximized dust capacity.

It is another advantage of the present invention to provide a vacuum cleaner in which the user may easily discard foreign matters collected in the dust collector, thereby enhancing the reliability of the user's emptying of the dust collector.

It is a further advantage of the present invention to provide a vacuum cleaner to perform iterative cleaning of the fine dust exiting the secondary cyclone dust collector.

To achieve the above advantages of the present invention, there is provided a multiple cyclone vacuum cleaner including: a cleaner body having mountings for a fan and a fan motor, and mounting for a primary cyclone body and dust tank; a first air inlet passage connected to the dust tank, for the intake of air and various foreign matter, a first air outlet passage at the top of the dust tank, for exhausting the air firstly removed of the foreign matter, a secondary cyclone body on the dust tank, for circulation of air in a direction perpendicular to the axial direction of the dust tank; a second air inlet passage connected to the first air outlet passage and the secondary cyclone body, for introducing the air and the foreign matters exhausted from the air outlet passage to the secondary cyclone body; a second air outlet passage exiting the lateral side of the secondary cyclone body near the second air inlet passage; and a foreign matter outlet passage connected to the secondary cyclone body and a second dust tank, for collecting the foreign matters separated from the air in the secondary cyclone body.

In another embodiment of the present invention, a vacuum cleaner has a removable cyclone dust collector in a cleaner body, wherein the cyclone dust collector sucks air containing foreign matter, separates the foreign matter from the air by cyclone action, collects the foreign matters in a dust tank, and exhausts the air to an air outlet passage connected to a fan, wherein the multiple cyclone vacuum cleaner includes a removable filter structure in the cleaner body connected to the air outlet passage of the cyclone dust collector having a dust filter for a second collection of fine dust contained in the air.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF DRAWINGS

The present invention will become more fully understood from the detailed description given hereinbelow and the accompanying drawings which are given by way of illustration only, and thus are not limiting of the present invention, and wherein.

DETAILED DESCRIPTION OF THE ILLUSTRATED EMBODIMENTS

A detailed description will be made below as to the illustrated embodiments of the present invention with reference to FIGS. 4 to 16.

Figure 1:
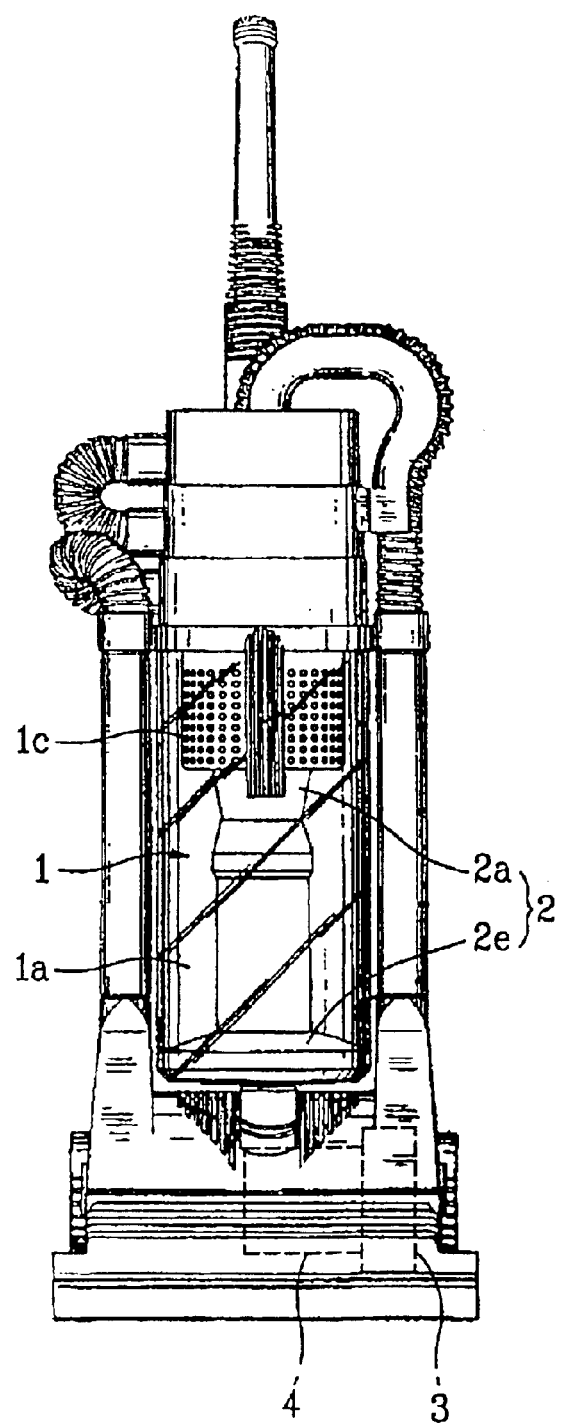
FIG. 1 shows an external appearance of a general upright type multiple cyclone vacuum cleaner.
Figure 2:
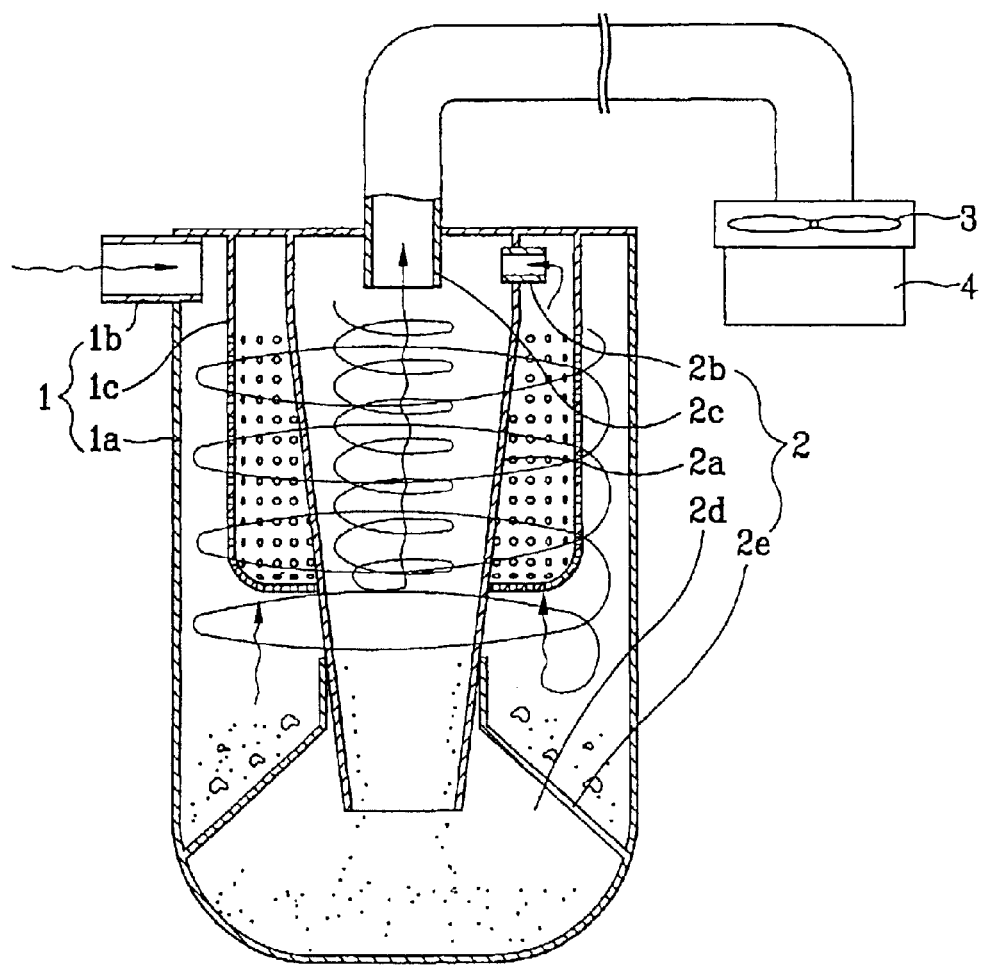
FIG. 2 is a schematic cross-sectional view showing the principal part of a cyclone dust collector shown in FIG. 1.
Figure 3:
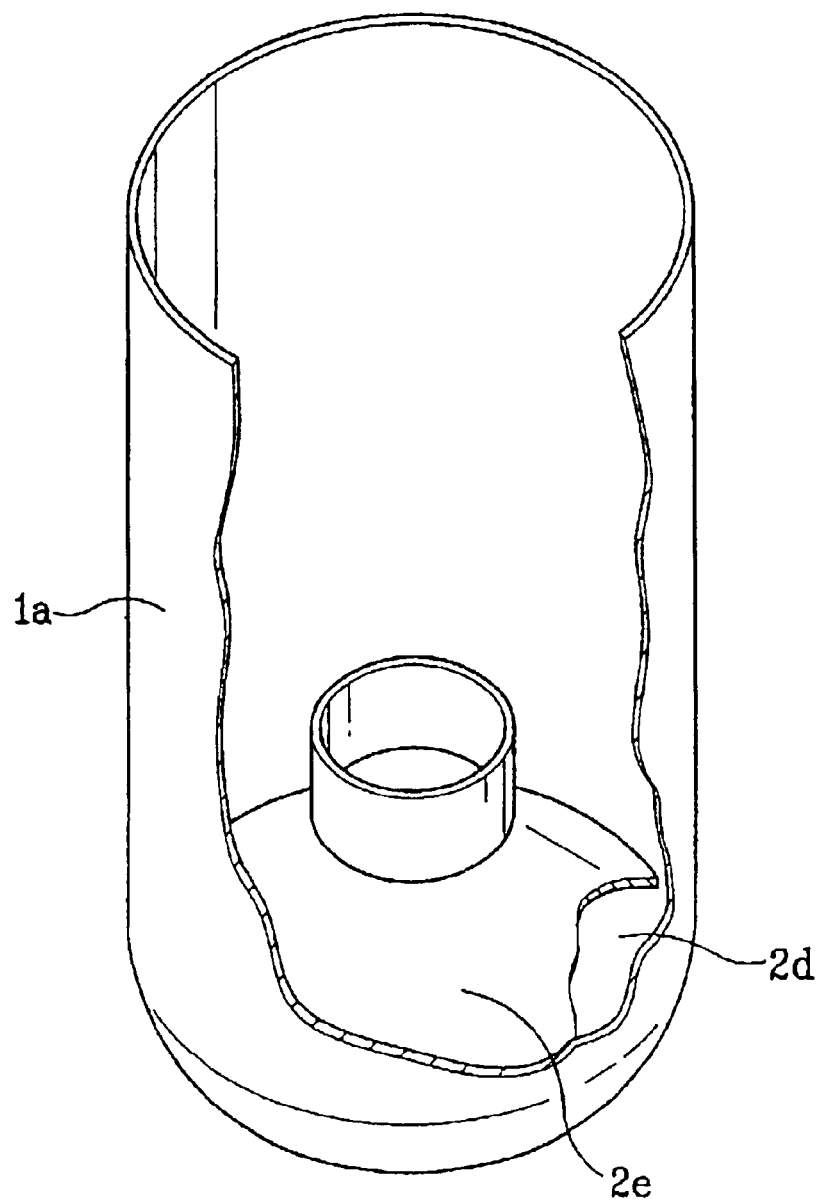
FIG. 3 is a perspective view of an exterior body of the cyclone dust collector shown in FIG. 2.
Figure 4:
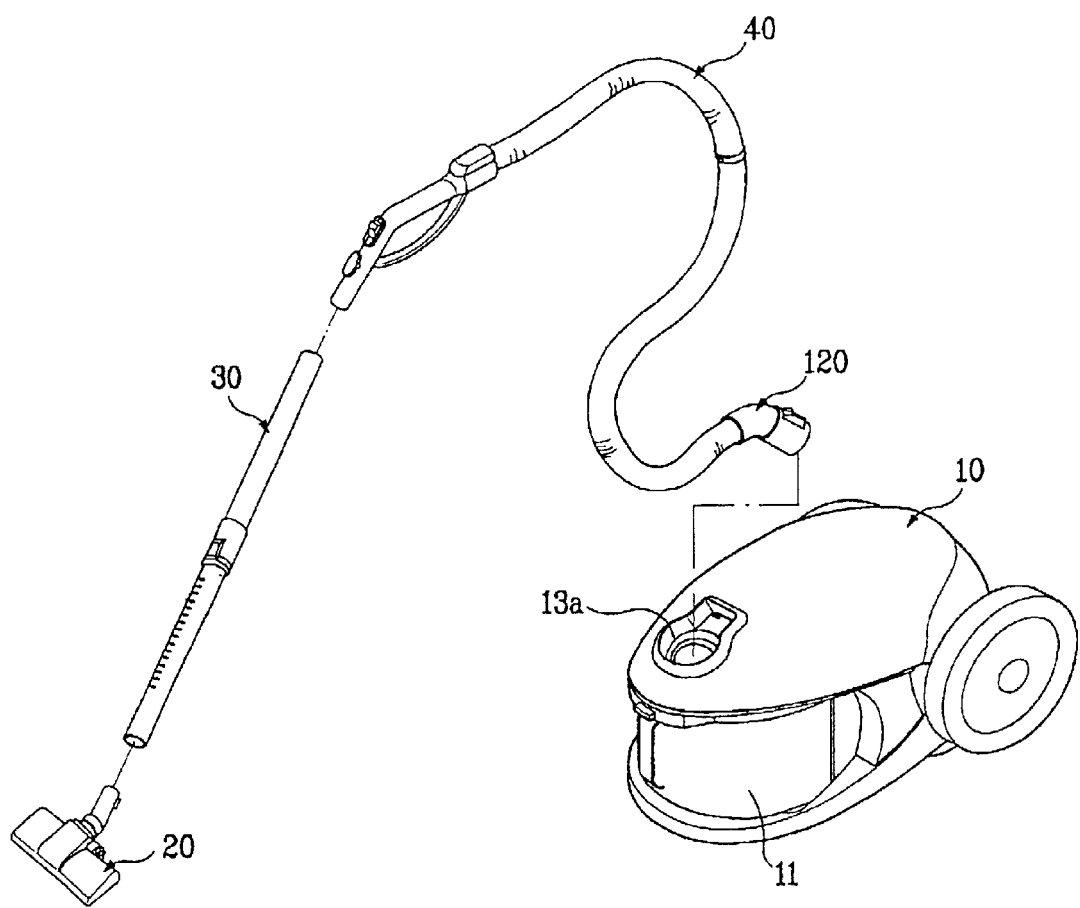
FIG. 4 is a schematic perspective view showing an external appearance of a multiple cyclone vacuum cleaner according to an embodiment of the present invention.
Figure 5:
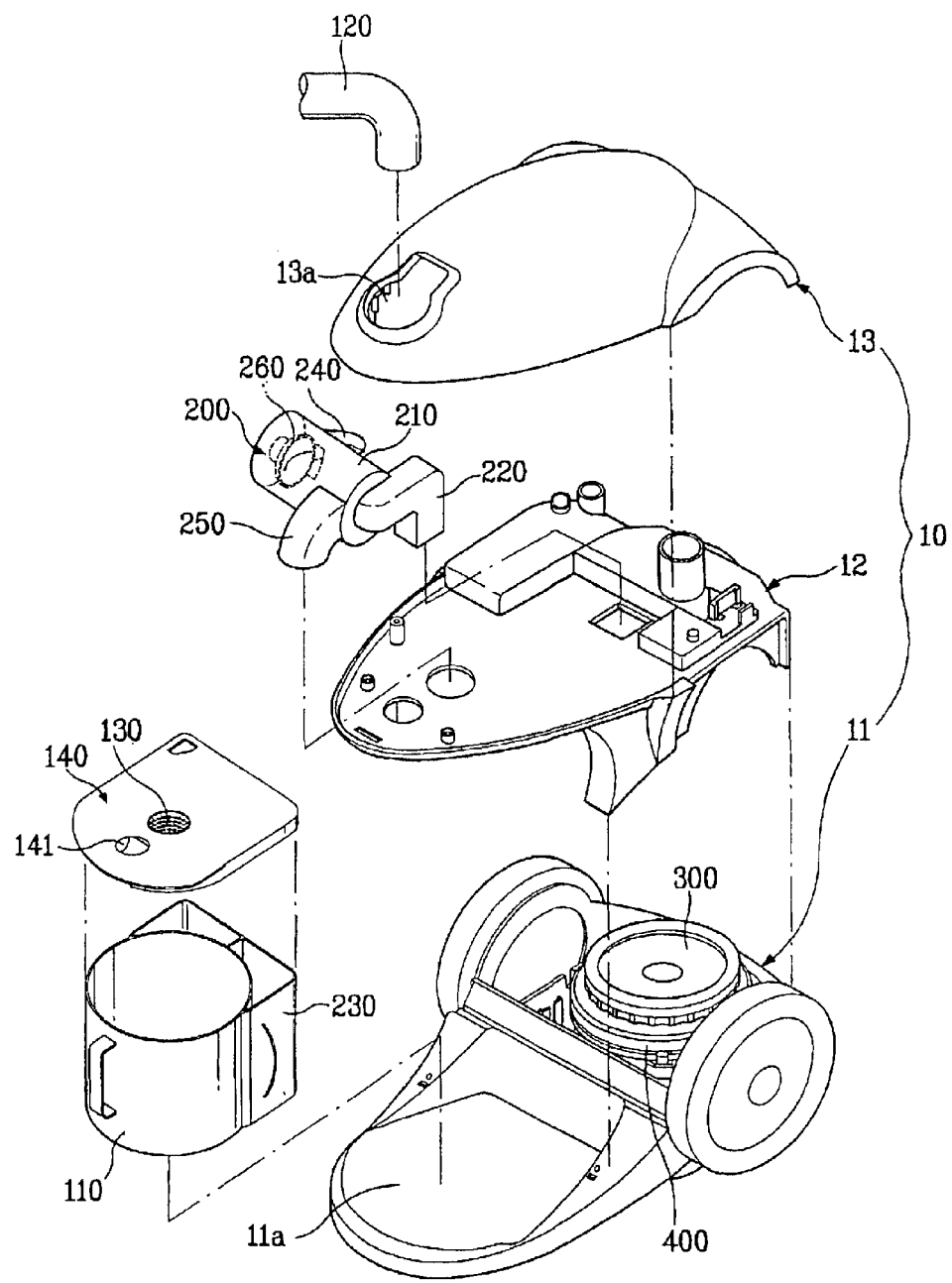
FIG. 5 is a schematic exploded perspective view of a multiple cyclone vacuum cleaner according to the embodiment of the present invention.
Figure 6:
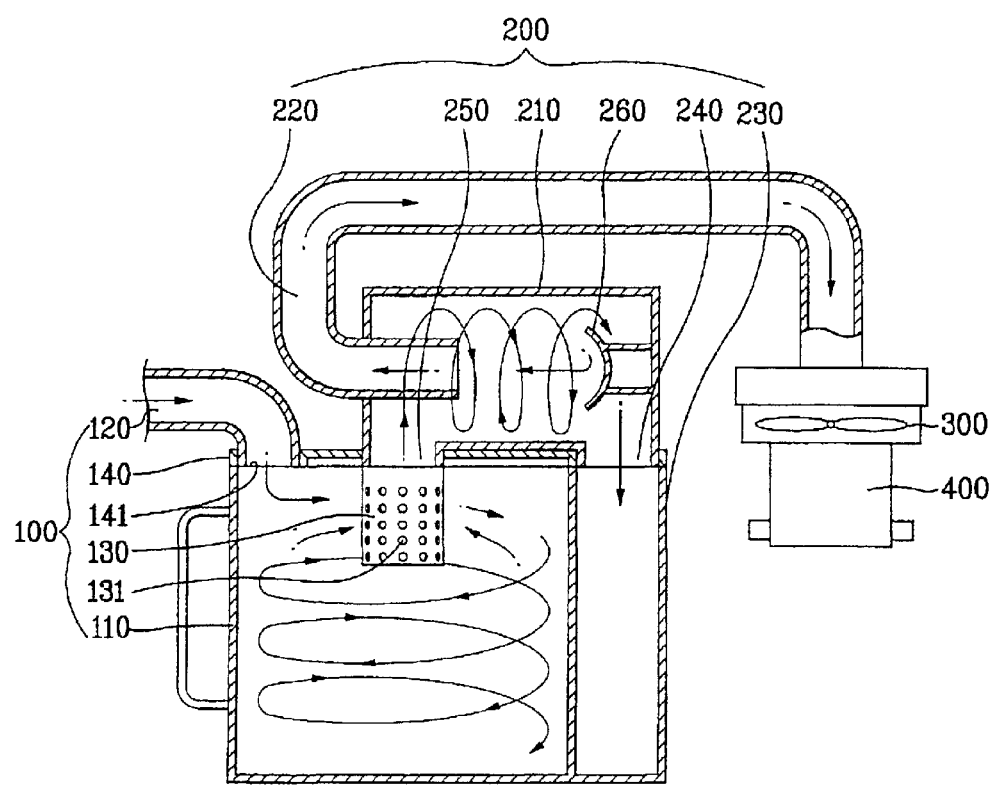
FIG. 6 is a schematic vertical cross-sectional view showing the structure of the cyclone dust collectors shown in FIG. 5.
Figure 7:
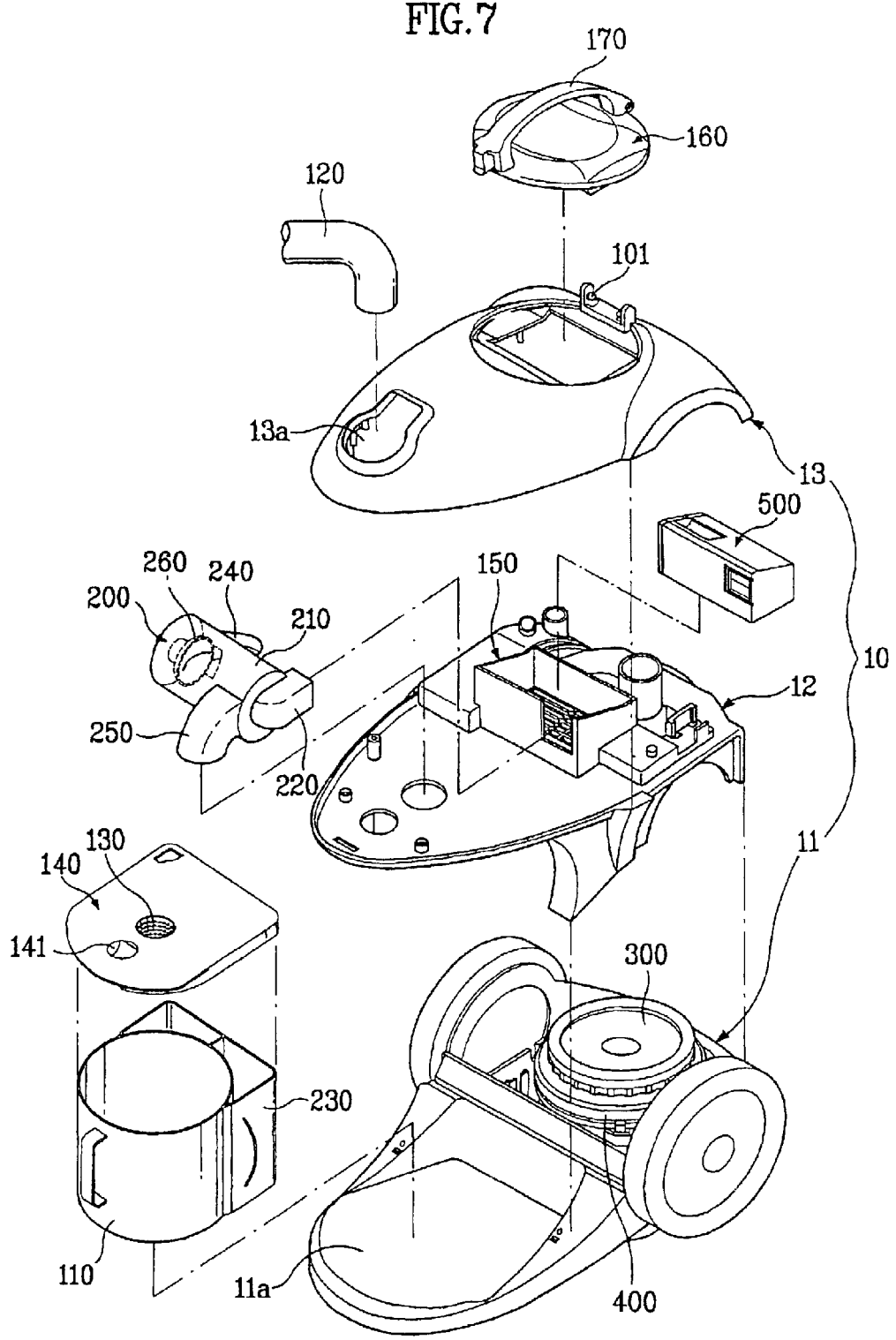
FIG 7 is a schematic exploded perspective view of a multiple cyclone vacuum cleaner according to another embodiment of the present invention.

FIG. 4 is a schematic perspective view showing an external appearance of a multiple cyclone vacuum cleaner according to an embodiment of the present invention. FIG. 5 is a schematic exploded perspective view showing an internal structure of the cyclone vacuum cleaner shown in FIG. 4. FIG. 6 is a schematic vertical cross-sectional view of the cyclone vacuum cleaner shown in FIG. 5.

An embodiment of the present invention is an application of a dual cyclone dust collector comprising first and secondary cyclone dust collectors 100 and 200 in a cleaner body 10 of a canister type vacuum cleaner, in which the primary cyclone dust collector 100 has a dust tank 110 with a maximized dust capacity. The dust tank 110 can be easily removed from the cleaner body 10 of the vacuum cleaner in order for the user to easily discard a variety of foreign matters collected in the dust tank 110.

The cleaner body of the canister vacuum cleaner is configured for the application of the dual type cyclone dust collector. The cleaner body 10 includes a lower body 11, an intermediate body 12 on the lower body 11, and a top cover 13 for covering the intermediate body 12.

The lower body 11 has a mounting for a fan 300 and a fan motor 400 and on an anterior side of the mounting there is formed a portion 11a for installation of a primary cyclone body and dust tank 110.

The top cover 13 forms a space where a secondary cyclone body 210 is located on the intermediate body 120, the space being closed to the outside of the cleaner body 10.

The primary cyclone dust collector 100 includes the primary cyclone body and dust tank 110, a first,air inlet passage 120 connected to the dust tank 110 for intake of air and various foreign matter, and a first air outlet passage 130 for discharging air removed of the foreign matters from the dust tank 110. The first air inlet passage 120 is connected to a suction hose 40 and enters the dust tank 110 via a through hole 13a formed on an anterior side of the top body 13.

The dust tank 110 has the top portion open, the top portion being optionally closed with a separate dust tank cover 140. The dust tank cover 140 has a first air outlet passage 130 and a pipe hole 141 interfacing with the first air inlet passage 120. The first air outlet passage 130 has a form of a perforated pipe with a plurality of through holes 131 in the circumference thereof. This prevents discharge of foreign matter introduced into the dust tank 110 of relatively large size with respect to the size of the through holes 131.

The secondary cyclone dust collector 200 includes a secondary cyclone body 2 10 located on the dust tank 110 of the primary cyclone dust collector 100, a second air inlet passage 250 connected to the secondary cyclone body 210 for intake of air and fine dust, a second air outlet passage 220 for discharging air removed of the fine dust from the secondary cyclone body 210, and a foreign matter outlet passage 240 for discharging the fine dust into a second dust tank 230.

The secondary cyclone body 210 provides an air stream in a direction perpendicular to the lengthwise direction of the first dust tank 110.

The second air inlet passage 250 has one end connected to the first air outlet passage 130 and the other end extending around the circumference of the one end of the secondary cyclone body 210. The second air outlet passage 220 has the one end entering through the lateral center of the secondary cyclone body 210 near the connection between the secondary cyclone body 210 and the second air inlet passage 250 and extending to the inside of the secondary cyclone body 210. The second air outlet passage 220 has the other end leading to the fan 300 and the fan motor 400.

The foreign matter outlet passage 240 has the one end connected along the circumference of the second end of the secondary cyclone body 210 opposite the second air inlet passage 250 and the other end in communication with the second dust tank 230.

The second dust tank 230 may be separate from and, preferably, may be integrated with the circumference of the dust tank 110 constituting the primary cyclone dust collector 100 in order for the user to discard the dust in both tanks at once. Therefore, the present invention provides an integrated structure with the dust tank 110 of the primary cyclone dust collector 100 integrated with the second dust tank 230 of the secondary cyclone dust collector 200.

An extension member 260 protrudes near where exhaust air exits the secondary cyclone body 210 in order to induce a more vigorous circulation of the exhaust air current in the secondary cyclone body 210. The extension member 260 is centrally positioned on the inside surface of the secondary cyclone body 210 opposite to the side of the second air outlet passage 220. The extension member 260 has the form of a skirt widening gradually towards the side of the second air outlet passage 220. The extension member 260 also separates an inlet port of the foreign matter outlet passage 240 from the site where the exhaust air current exits, and thereby prevents the exhaust air current from entrapping the foreign matter discharged from the foreign matter outlet passage 240.

In an example where the multiple cyclone dust collector is used in the cleaner body 10 of the canister type vacuum cleaner according to the first embodiment of the present invention as constructed above, the dust collector volume is maximized.

Next, a detailed description of the operation of the multiple cyclone vacuum cleaner according to the first embodiment of the present invention as constructed above is given.

First, the fan motor 400 rotates the fan 300 to cause a suction force. Air and various foreign matters are sucked into a suction opening body 20 constituting the vacuum cleaner and introduced into the first air inlet passage 120 of the primary cyclone dust collector 100 via an extension pipe 30 and the suction hose 40. Thus, the foreign matter is successively introduced into the primary cyclone body and dust tank 110. Foreign matter relatively large with respect to the diameter of the through holes 131 of the first air outlet passage 130 are collected in the dust tank 110. The air and foreign matter relatively small with respect to the diameter of the through holes 131 of the first air outlet passage 130 pass through the first air outlet passage 130 and the second air inlet passage 250 and enter the secondary cyclone body 210.

The secondary cyclone body 210 separates the fine foreign matter from the air due to cyclone action during the entrance to the secondary cyclone body 210. This results from the second air inlet passage 250 extending in the direction tangential to the circumference of the secondary cyclone body 210. That is, the suction force from the second air outlet passage 220 is in a direction perpendicular to the air entrance direction of the second air inlet passage 250, so that air and fine dust entering into the secondary cyclone body 210 make cyclone motion and are separated from each other.

Thereafter, the fine dust removed from the air circulates around the inner wall of the secondary cyclone body 210 and enters the second dust tank 230 via the foreign matter outlet passage 240. The air separated from the fine dust circulates through the secondary cyclone body 210 and collides with the extension member 260, during which the air exits to the fan 300 and the fan motor 400 via the second air outlet passage 220.

FIGS. 7 to 10 illustrate a multiple cyclone vacuum cleaner according to a second embodiment of the present invention.

In the second embodiment of the present invention, a filter structure 500 is further provided between the second air outlet passage 220 constituting the secondary cyclone dust collector 200 and the fan 300, and a dust filter 510 is provided in the filter structure 500 for collecting the fine dust left in the air. The filter structure 500 is detachable from the cleaner body 10 in order to easily perform cleaning. For this purpose, receptacle 150 for receiving the filter structure 500 is provided on a top anterior side of the intermediate body 12 of the cleaner body 10. The receptacle 150 is positioned on the topside of the intermediate body 12. The receptacle 150 is connected to the fan.

The above filter structure 500 completely eliminates various fine foreign matters not removed by the cyclone effect with a separate filter 500. The structure is configured to completely remove the lightest particles or hairs that may be contained in the air exiting the secondary cyclone dust collector 200 so as to prevent possible damage to the fan motor 400. The dust filter 510 in the filter structure 500 has an iterative profile in order to eliminate dust as much as possible in spite of the small size of the dust filter 510 and so that the contact area of the dust filter with the air passing thereby is maximized to enhance the performance of the dust filter for dust collection.

The filter structure 500 includes a filter body 520 and a filter guide 530 optionally provided in the filter body. The filter body 520 has a rectangular parallelpiped profile with the bottom and the one side open and has a second hole 521 connected to the second air outlet passage 220. When the filter guide 530 is inserted in the filter body 520, the one side closes the open portion of the filter body 520, and the open bottom side of the filter body 520. The inner bottom receives the dust filter 510. The profile of the filter body 520 is not specifically limited to a rectangular parallelpiped and may be polyhedral or cylindrical.

The filter body. 520 and the filter guide 530 may have a mutual drawer-like interaction for convenience in removable installation. For this purpose, guide protrusions 522 may be formed on opposite inner surfaces of the filter body 520, and guide grooves 531 corresponding to the guide protrusions 522 are formed on the opposite sides of the filter guide 530. A handle groove 523 may be formed at the edge of the topside of the filter body 520 in contact with the filter guide 530. The handle groove 523 serves as a handle to facilitate removal of the filter guide 530 from the filter body 520.

As the cleaner operates, dust is separated from the air passing through the primary and secondary cyclone dust collectors 100 and 200 and the air removed of the dust passes through the filter structure 500 in the course of exiting from the second air outlet passage 220 to the fan 300 and the fan motor 400. Fine dust contained in the flowing air is removed by the dust filter 510 in the filter structure 500. The fine dust flowing through the second air outlet passage 220 enters the inner space of the filter structure 500 via the through holes 521 of the filter structure 500. Then, the air and the fine dust continue passing through the dust filter 510 provided at the bottom of the filter structure 500. Thus the dust filter 510 removes the fine dust contained in the air and the fine dust remains in the filter structure 500, while the clean air removed of the fine dust passes through the dust filter 510 to the fan 300 and the fan motor 400. The residual fine dust separated from the air is collected in the filter structure 500, so that the foreign matter cannot reach the fan motor 500, even when the fine dust exits since the dust tank 230 is full. If a user forgets to empty the second dust tank 230 when full and the fine dust exits the secondary cyclone 200, the fine dust is collected instead in the filter also in filter structure 500, so as to prevent damage to the fan motor 400 by the fine dust.

The filter structure 500 as constructed above may be configured to be completely removable from the cleaner body 10 by a user who desires to clean the filter structure 500. Therefore, the present invention has a receptacle 150 in the cleaner body 10 that is open to the topside of the cleaner body 10.

A cover 160 is provided on the top cover 13 over the receptacle 150 for selectively opening/closing the receptacle 150. The cover 160 has a handle 170 for convenience in handling. The handle 170 extends from the anterior side to the posterior of the cover 160. The handle 170 has a posterior side hinged on the cleaner body 10 with a hinge 101 and an anterior side selectively removable from the cleaner body 10 by means of a stopper means. The handle 170 serves as both a handle for opening/closing the cover 160 for the removal of the filter structure 500 and a handle for carrying the cleaner body 10.

This simplifies the structure and manufacturing of the vacuum cleaner by having a single handle for carrying the vacuum cleaner and for removing the cover 160.

To discard the fine dust collected in the filter structure 500, a user detaches the handle 170 from the cleaner body 10 and turns the cover 160 integrated with the handle 170 to open the receptacle 150 which contains the filter structure 500. The user then removes the filter structure 500 from the receptacle 150 by use of the handle groove 523 formed on the top of the filter structure 500 and discards the fine dust collected in the filter structure 500. After removal of the filter structure 500 from the receptacle 150, the user disassembles the filter structure 500 into the filter body 520 and the filter guide 530 and empties the fine foreign matters from the filter body 520. The filter structure 500 is easily disassembled because the filter body 520 interacts with the filter guide 530 in a drawer-like manner. A defined space is formed between the top of the filter guide 530 and the upper surface of the dust filter 510 as the former is higher than the latter, so that various foreign matter piling up on the dust filter 510 cannot leak out to the outside even when the filter guide 530 is removed from the filter body 520 of the filter structure 500.

Figure 8:
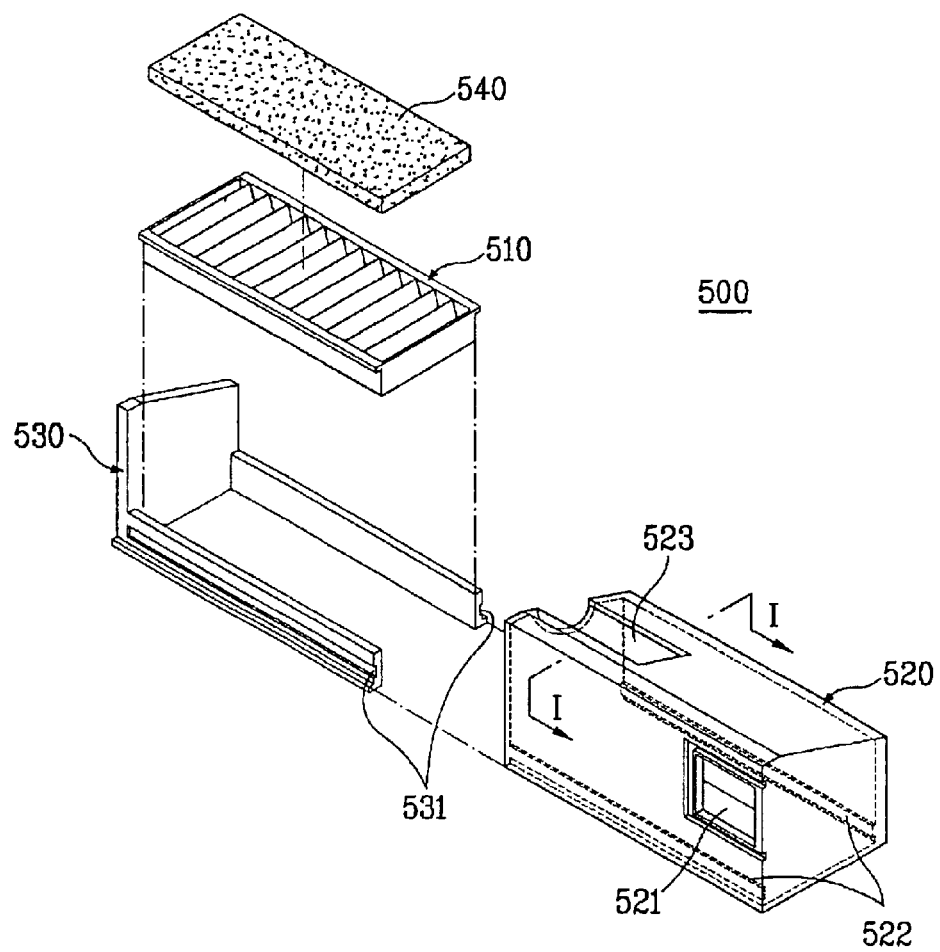
FIG. 8 is an exploded perspective view showing a filter structure shown in FIG. 7.
Figure 9:
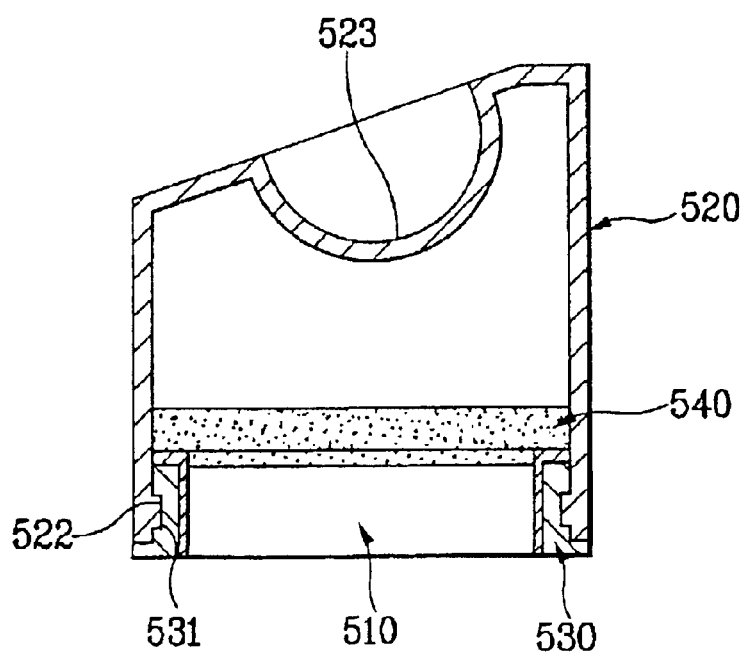
FIG. 9 is a vertical cross-sectional view taken along line I—I of FIG. 8.
Figure 10:
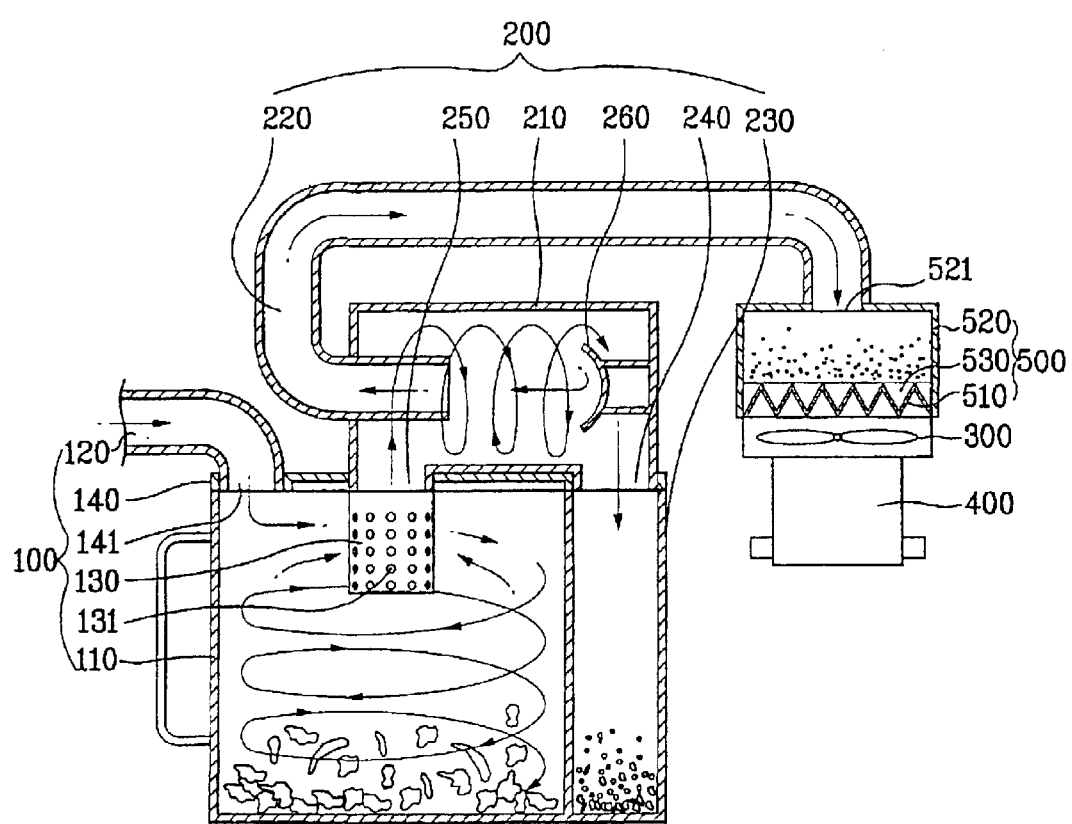
FIG. 10 is a schematic vertical cross-sectional view showing the internal structure of the multiple cyclone vacuum cleaner according to another embodiment of the present invention.

A separate filter may be provided in the filter structure 500 in addition to the dust filter 510 to further collect fine dust, but the installation of too many filters may require an excessive driving force of the fan motor and result in deterioration of suction force. The addition of a separate filter 540 as shown in FIGS. 8 and 9 may enhance the efficiency of dust collection.

In a second embodiment of the present invention, a structure designed to further collect the fine dust contained in the air passed through the secondary cyclone dust collector 200 may have a filter structure 500 in the air path between the primary cyclone dust collector 100 and the secondary cyclone dust collector 200, or on the air path to the fan motor 400 via a single cyclone dust collector in the vacuum cleaner with either one of the above cyclone dust collectors.

The stopper means for engaging the handle 170 with the cleaner body 10 can have a hook type structure. However, such a hook type stopper according to the related art is configured to impose a force in the same direction as the user turns the handle 170 in opening the cover 160 so that the stopper means is sometimes released by contact with a structure during cleaning, which opens the cover portion 160. unintentionally. This results in a safety problem.

Figure 11:
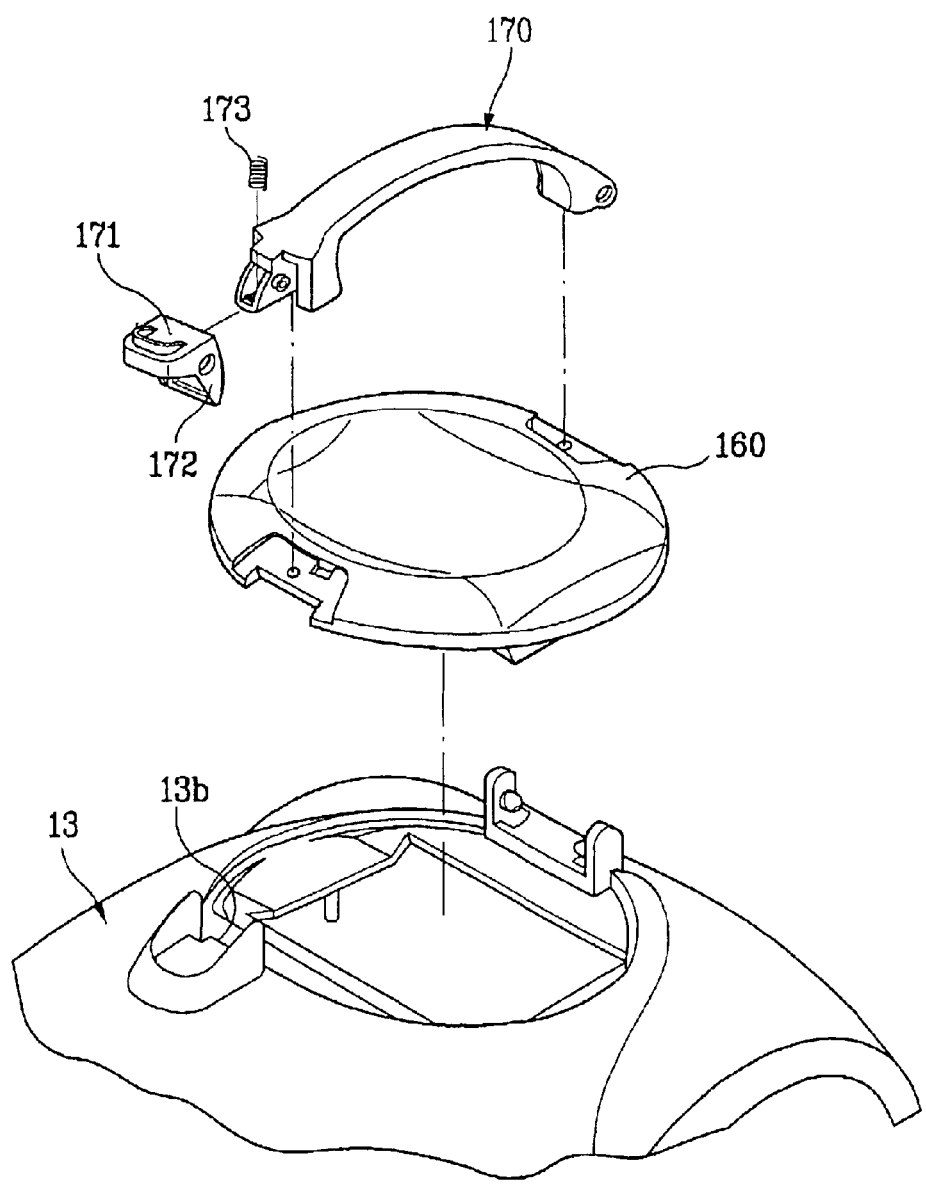
FIG. 11 is an exploded perspective view showing the principal part of a stopper according to the present invention.
Figure 12A:
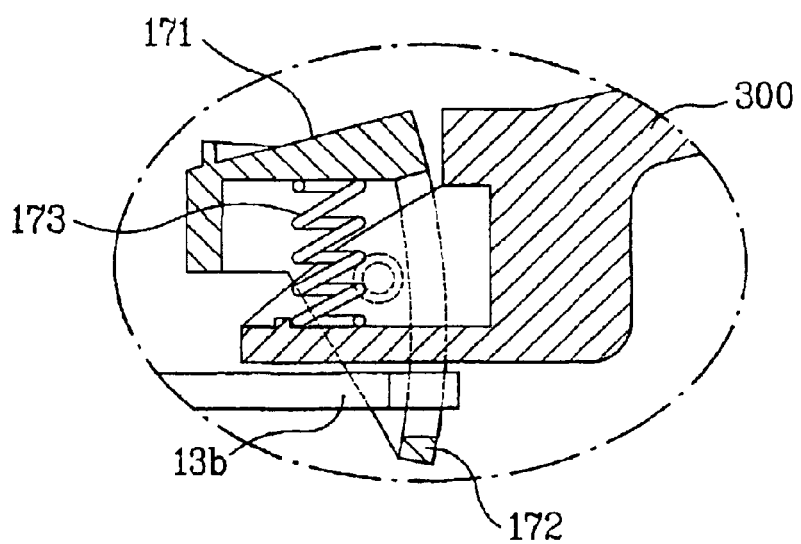
FIGS. 12a and 12b are enlarged cross-sectional views showing apart of the stopper shown in FIG. 11, in which the stopper is associated with and detached from the cleaner body.
Figure 12B:
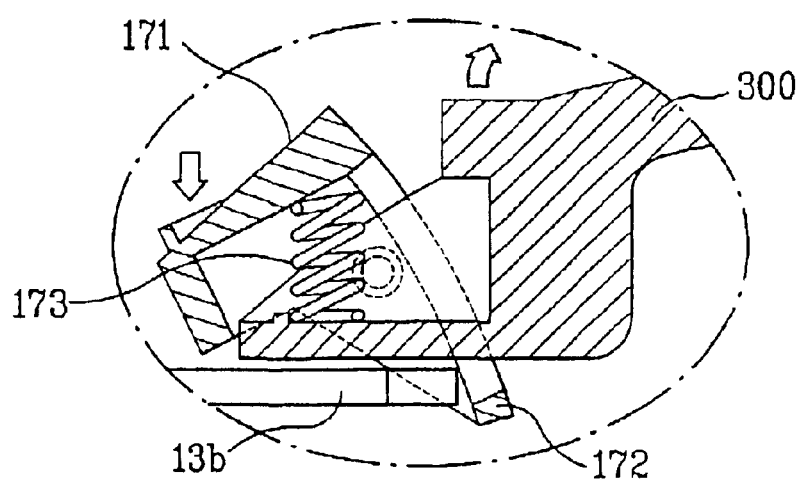

To address this problem, the present invention may be configured to open the cover 160 only when a force is imposed on the stopper means in a direction opposite to the turning direction of the handle 170 for opening the cover 160. The stopper means of the present invention, as shown in FIG. 11 and FIGS. 12*a* and 12*b,* includes a stopper 13*b* formed on the top cover 13 of the cleaner body 10 and having a protrusion protruding towards the receptacle 150, a tension member 17, provided at an anterior end portion of the top cover 13 towards the inside of the dust collecting space, and a holding ring 172 extending downward from the tension member 171 and selectively fastened by the stopper 13*b*. The tension member 171 rotates at the anterior end portion of the handle 170 and is biased by a spring 173.

The holding ring 172 is substantially U-shaped and, for quick engagement to the stopper 13*b*, has both sides inwardly slanted towards the lower end. Thus the user may open the receptacle 150 by pulling the handle 170 with the tension member 171 pushed down and turn the cover 160. As the user pushes down the tension member 171, the tension member 171 rotates and the holding ring 172 extends downward from the tension member 171 which is also turned backward, as illustrated in FIG. 12*b*. The holding ring 172 is released from the stopper 13*b* of the cleaner body 10. At the same time, the user turns the cover 160 towards a posterior side of the cleaner body 10 to completely open the receptacle 150.

Figure 13:
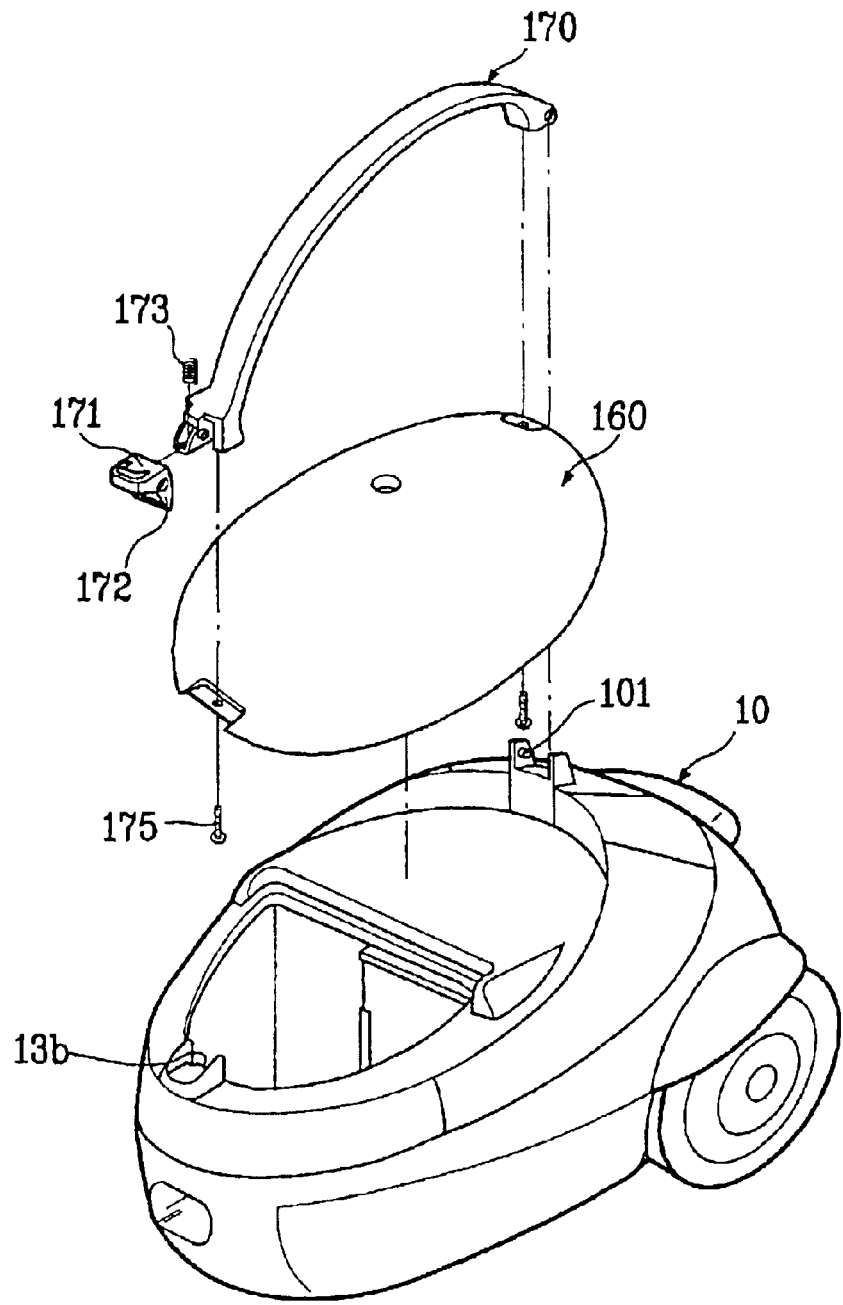
FIG. 13 is an exploded perspective view showing a situation that the stopper shown in FIG. 11 is applied to a general vacuum cleaner.

The structure of the stopper means as described above can be used for many applications. The stopper structure is applicable to a general canister type vacuum cleaner as shown in FIG. 13 wherever the stopper means is required. The stopper means provides increased stability during carrying. When the user pulls the handle 170 without pushing down the tension member 171, the stopper 13*b* of the cleaner body 10 engages the holding ring 172 and firmly engages the holding ring 172.

Figure 14:
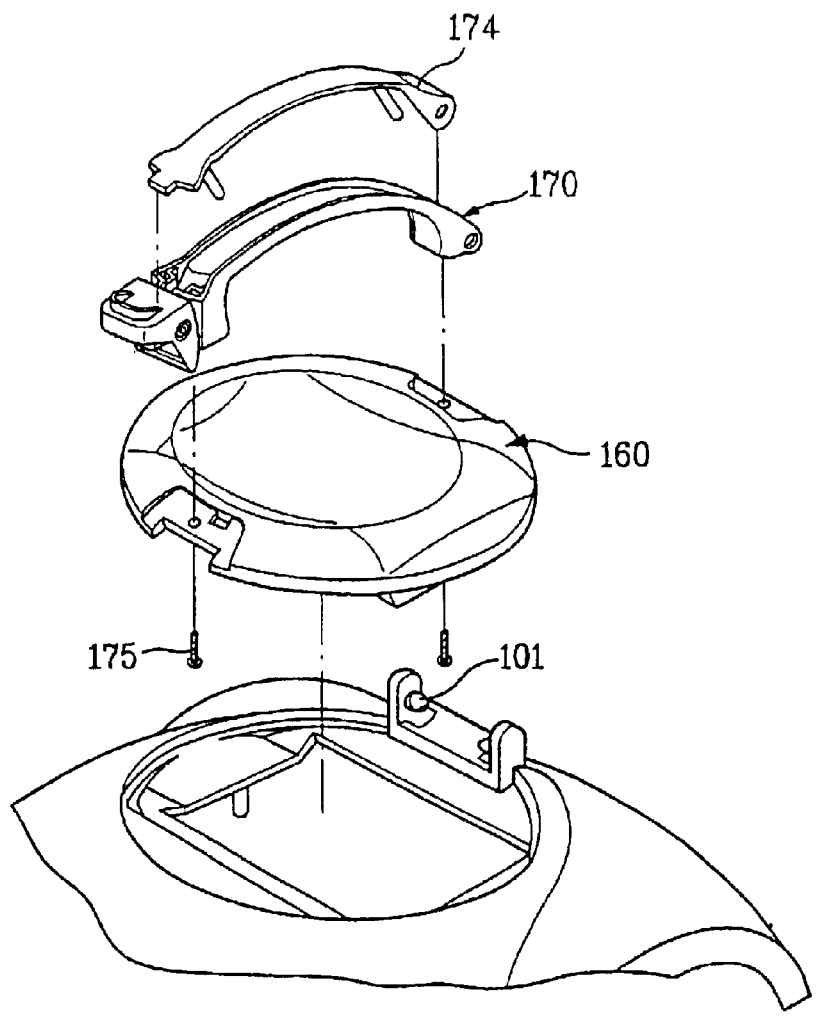
FIG. 14 is a detailed exploded perspective view showing the double structure of a handle according to the present invention.
Figure 15:
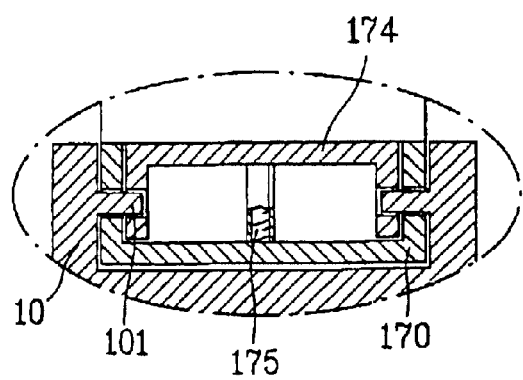
FIG. 15 is a detailed cross-sectional view showing a part of the handle shown in FIG. 14, in which the handle is hinged to a cleaner body.

Furthermore, the handle 170 of the present invention also serves as a handle of the cleaner body so as to be stably associated with the cleaner body 10. When a typical hinged handle is deformed during carrying, the deformation may cause the handle to unfasten. Such a distortion of the handle portion 170 occurs often when the user holds the handle portion 170 in carrying the cleaner body 10 with a force concentrated on the hinge 101. To overcome this problem, the present invention includes a double structure of the handle portion 170 in which an internal reinforced member 174 is further provided to the hinge 102 of the handle 170, as illustrated in FIGS. 14 and 15. The reinforced member 174 may be simply provided to a part of the hinged portion and, when applied to the handle 170 as shown in FIG. 14, constructed to serve as a cover of the handle 170. The handle 170 and the reinforced member 174 maybe joined by a bolt 175, an adhesive or some other means. This structure prevents undesired release of the handle portion 170 from the cleaner body 10 by use of the reinforced member 174 to prevent the distortion of the handle 170. Here, the internal reinforced member 174 is fixed on the handle 170 by means of the bolt 175 or the like.

Figure 16:
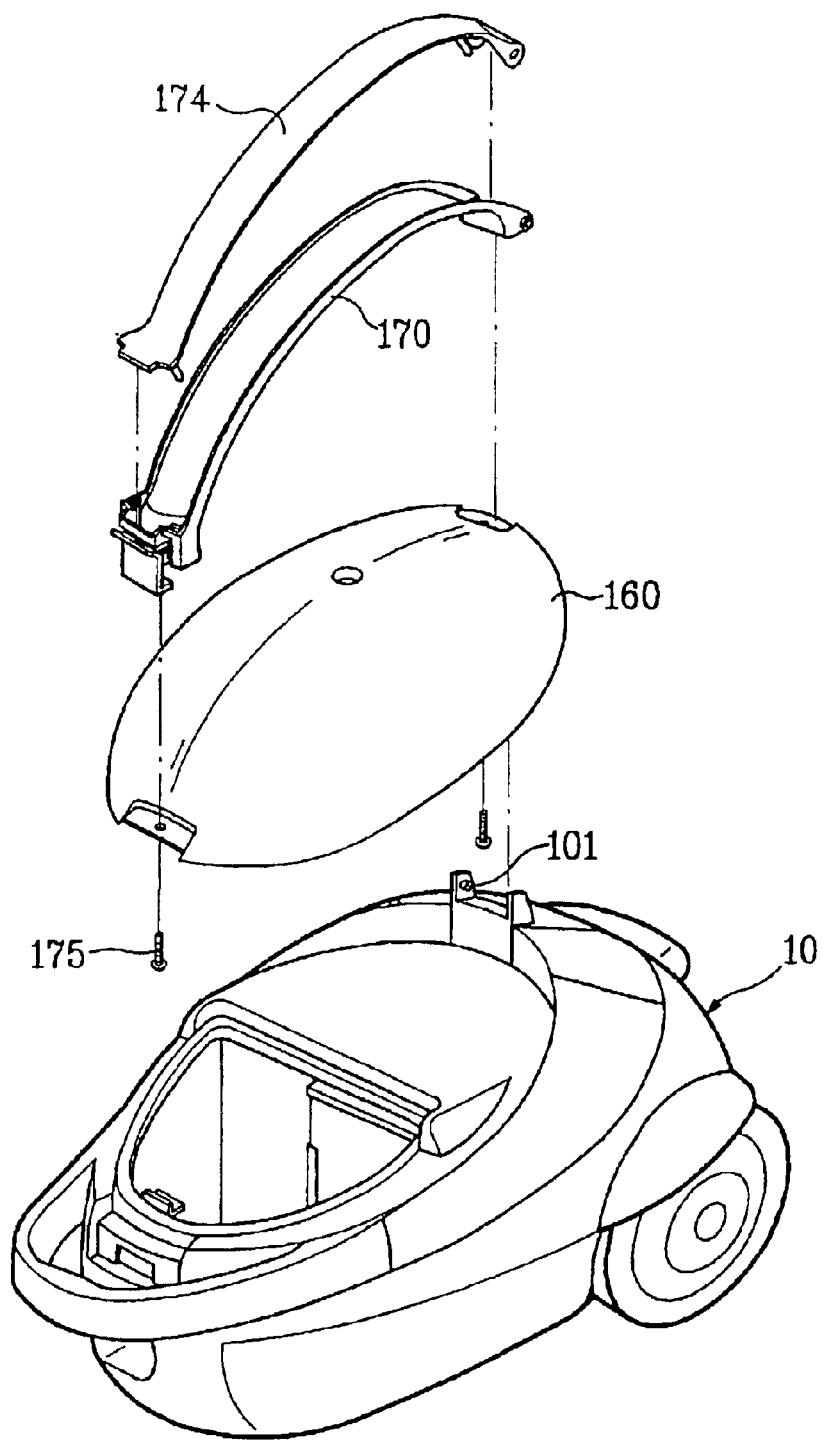
FIG. 16 is an exploded perspective view showing the handle shown in FIG. 14 is applied to a general vacuum cleaner.

The structure for supplementing the hinge 101 as described above can be used for many applications, i.e., the structure is applicable to a general canister type vacuum cleaner as shown in FIG. 16 and all locations a general hinge joint.

Consequently, the present invention allows the application of the dual cyclone dust collector to a canister type vacuum cleaner and further removes foreign matter completely, thereby satisfying the user.

As described above, the present invention increases the dust capacity of the dual cyclone dust collector, which reduces the size of the cyclone dust collector, and the dual cyclone dust collector can therefore be applied to the canister type vacuum cleaner. In applying the present invention to the canister type vacuum cleaner, the dust tank is easily removable from the cleaner body so that the user can handle the dust tank when discarding the foreign matters from the dust tank.

Furthermore, the present invention further includes a filter structure having a dust filter in the vacuum cleaner using the cyclone principle, thereby achieving a complete collection of fine foreign matter not collected by the cyclone dust collectors. Therefore, foreign matter is prevented from reaching the fan motor through a second dust collection at the filter structure, even when the dust tank of the respective cyclone dust collectors does not remove all of the fine dust from the air. The filter structure is configured to be removable from the topside of the cleaner body so that the user can easily discard the collected foreign matter from the filter structure.

Furthermore, the present invention improves the stopper and hinge structures of the handle portion for opening the dust collector cover for stable manipulation and prevention of unintended opening of the dust collector. Thus the present invention is very useful in the industrial aspects due to the above-mentioned advantages.

Although the preferred embodiments of the present invention have been disclosed for illustrative purposes, those skilled in the art will appreciate that various modification, additions and substitutions are possible, without departing from the scope and spirit of the invention as recited in the accompanying claims.

What is claimed is:

1. A multiple cyclone vacuum cleaner comprising:
   a cleaner body having a space for mounting a fan and a fan motor, and an externally exposed space for selectively mounting a primary cyclone body and dust tank;
   a first air inlet passage provided in communication with the dust tank, for intake of air and various foreign matters;
   a first air outlet passage provided at the top of the dust tank, for exhausting the air firstly removed of the foreign matters;
   a secondary cyclone body provided on the dust tank, for circulation of air in a direction perpendicular to the axial direction of the dust tank;
   a second air inlet passage provided in communication with the first air outlet passage and the secondary cyclone body, for introducing the air and the foreign matters exhausted from the first air outlet passage to the secondary cyclone body;
   a second air outlet passage piercing the lateral side of the secondary cyclone body in the vicinity of the second air inlet passage; and
   a foreign matter outlet passage provided in communication with the secondary cyclone body and a second dust tank, for introducing the foreign matters separated from the air in the secondary cyclone body to the second dust tank.

2. The multiple cyclone vacuum cleaner as claimed in claim 1, wherein the cleaner body comprises:
   a lower body provided with the fan and the fan motor;
   an intermediate body provided at the top of the lower body to form the space for mounting the fan and the fan motor and a space for mounting the dust tank on an anterior side thereof; and
   a top cover having a defined space for mounting the secondary cyclone body on the intermediate body and closing the defined space from the outside.

3. The multiple cyclone vacuum cleaner as claimed in claim 2, further comprising a filter structure provided on an air path of air flowing from the second air outlet passage to the space for mounting the fan, the filter structure being in communication with the second air outlet passage and the fan mounting space and having a separate dust collecting space, the dust collecting space being internally provided with a dust filter.

4. The multiple cyclone vacuum cleaner as claimed in claim 3, further comprising a cover portion for selectively opening or closing an open portion of the top cover constituting the cleaner body, the filter structure being positioned at the open portion.

5. The multiple cyclone vacuum cleaner as claimed in claim 4, wherein the cover portion of the cleaner body has the one end thereof hinged on the cleaner body and an end portion of the topside thereof integrated with a stopper structure including a hook for selectively holding the cleaner body.

6. The multiple cyclone vacuum cleaner as claimed in claim 1, wherein the second dust tank is integrated with the circumference of the primary cyclone body and dust tank.

7. The multiple cyclone vacuum cleaner as claimed in claim 1, further comprising a skirt-shaped extension member provided on the opposite side to the side of the second air outlet passage in the secondary cyclone body, the extension member gradually widening towards the side of the second air outlet passage.

8. A multiple cyclone vacuum cleaner in a vacuum cleaner having a cyclone dust collector removably provided in a cleaner body, wherein the cyclone dust collector sucks air containing foreign matters, separates the foreign matters from the sucked air by way of a cyclone principle, collects the foreign matters in a dust tank and exhausts the air to a space for mounting a fan via an air outlet passage,
   the multiple cyclone vacuum cleaner comprising a filter receiver removably provided in the cleaner body, the filter receiver having a separate dust collecting space between the air outlet passage of the cyclone dust collector and the fan mounting space, and being provided with a dust filter for a second dust collection of fine dusts contained in the air.

9. The multiple cyclone vacuum cleaner as claimed in claim 8, wherein the dust filter received in the filter receiver has the form of a plurality of iterative prominence and hollows.

10. The multiple cyclone vacuum cleaner as claimed in claim 8, wherein the filter receiver comprises:
   a receiver body having the form of a hollow rectangular parallelpiped or polyhedron with a space for mounting a fan motor and an open portion perpendicular to the fan motor mounting space; and
   a filter guide having the one end thereof selectively opening or closing the open portion of the receiver body, the filter guide receiving the dust filter for a second dust collection of the fine dusts exhausted to the fan motor mounting space via the open portion.

11. The multiple cyclone vacuum cleaner as claimed in claim 10, wherein the receiver body of the filter receiver comprises guide protrusions formed on a contact inside thereof being in contact with both outer sides of the filter guide, and guide grooves corresponding to the guide protrusions on both sides of the filter guide, the guide protrusions being associated with the guide grooves in a drawer-like manner.

12. The multiple cyclone vacuum cleaner as claimed in claim 10, the receiver body of the filter receiver has a handle portion by recessing a part of the edge on the topside of the receiver body to be in contact with the one end of the filter guide.

13. The multiple cyclone vacuum cleaner as claimed in claim 8, further comprising an open portion provided on the side of the filter receiver in the outside of the cleaner body, and a cover portion selectively closing the open portion.

14. The multiple cyclone vacuum cleaner as claimed in claim 13, wherein the cover portion of the cleaner body has the one end thereof hinged on the cleaner body and the topside thereof integrated with a handle portion including a stopper means for selectively holding the cleaner body.

15. The multiple cyclone vacuum cleaner as claimed in claim 14, wherein the stopper means is manipulated for a release operation in the direction opposite to a turning direction for opening the cover portion.

16. The multiple cyclone vacuum cleaner as claimed in claim 14, wherein the stopper means comprises:

a stopper formed on the cleaner body and having a defined portion protruding towards the dust collecting space;

a tension portion provided at an anterior end of the cover portion and elastically moving towards the inside of the dust collecting space; and a holding ring formed at the bottom of the tension portion and selectively caught by the stopper.

17. The multiple cyclone vacuum cleaner as claimed in claim 16, wherein the holding ring is substantially "U"-character shaped and has both sides thereof inwardly slanted towards the lower end.

18. The multiple cyclone vacuum cleaner as claimed in claim 14, wherein the handle portion has a double hinged structure with a separate reinforced member at a hinged portion thereof.

19. The multiple cyclone vacuum cleaner as claimed in claim 18, wherein an exterior body is integrated with an interior body by way of a fastening means or an adhesive means.

20. The multiple cyclone vacuum cleaner as claimed in claim 13, wherein the cover portion comprises a transparent material for observing the amount of dusts collected in the filter receiver mounted in the cleaner body.

* * * * *